Jan. 27, 1959 TZU EN SHEN 2,871,428

CONSTRUCTION OF ELECTRIC CIRCUITS

Filed Jan. 20, 1954

Inventor
Tzu En Shen

By Hopgood, Leonard & Buell
his Attorneys

United States Patent Office 2,871,428
Patented Jan. 27, 1959

2,871,428

CONSTRUCTION OF ELECTRIC CIRCUITS

Tzu En Shen, Ealing, London, England, assignor to British Dielectric Research Limited, London, England, a British company Application January 20, 1954, Serial No. 405,229

Claims priority, application Great Britain February 20, 1953

5 Claims. (Cl. 317—242)

Figure 1:
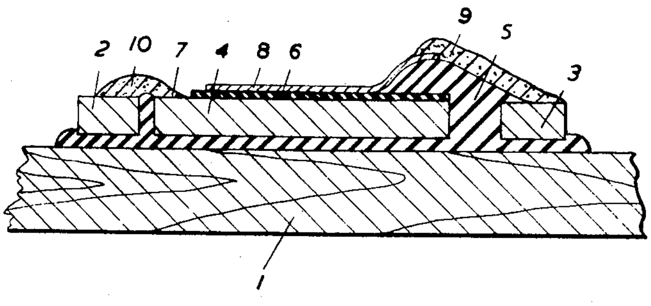

This invention relates to electric circuits of the kind known as "printed circuits." Such a circuit is one which is formed mainly by applying to one or both surfaces of an insulating supporting sheet, which is either flat or curved, a set of conductive lines and areas adhering thereto, so shaped, disposed and dimensioned as to provide the connections of an electric circuit with or without circuit elements therein, such as inductors and resistors. The conductive lines and areas may for example be made by applying powder of metal or carbon in an adhesive medium. Application can be made by impressing or stencilling, or by other means. Such circuits are suitable for certain kinds of wireless receivers or other apparatus using small electric currents.

In the production of such circuits it is not usually practicable to form large capacitors above, say 1000 pf. by this method of manufacture, since the insulating supporting sheet is not suitable to serve as the dielectric of a capacitor of the required capacitance in the area available. By the present invention this difficulty is overcome by the combination with a printed circuit and the support therefor of one or more capacitors, each formed by a sheet or layer of metal attached to the supporting sheet and forming one of the electrodes (the inner electrode) and having the dielectric formed by a chemical compound, for instance an oxide, of the metal which adheres to one face thereof, and the other electrode (the outer electrode) formed by a conductive layer deposited on the dielectric.

In producing the circuit prior to applying the capacitor thereto, means for attachment, for instance an adhesive applied to the appropriate area of the surface of the supporting sheet, may be provided to receive the capacitor. The attachment will be conductive if electrical connection is to be made by it to the metal electrode. Other forms of conductive connection may be used.

It is well known that a dielectric layer of the kind described is self-healing on breakdown if the outer electrode is very thin. Such an electrode is obtained by making the deposit from metal vapour in a vacuum. It is important to make connection from this deposit to the appropriate part of the circuit in such a manner as to avoid impairing this property. One way of doing this is to apply to a minor area of the dielectric near one edge of the metal base, a layer of insulating material which extends over the edge to part of the supporting sheet and then to cause the conductive metal deposit to be applied over this insulant as well as over the remaining area of the dielectric. The upper surface of this added insulating layer should merge smoothly into the surfaces of the dielectric and of the supporting sheet to ensure the continuity of the connection. This insulating material can be added in various ways.

Suitable metals for the sheet or foil forming the inner electrode are aluminium, magnesium and tantalum. On these metals the dielectric may be formed by oxidation in known manner.

Two printed circuits in accordance with the invention will be described by way of example with reference to the accompanying drawing in which Figure 1 and Figure 2 each represent cross-sections of parts of the two circuits. The thickness of the various conductive and insulating layers forming the printed circuit and the capacitor are exaggerated to make the method of assembly more clear.

Referring to Figure 1, the support for the printed circuit is a sheet 1 of insulating material, for example that sold as "Paxolin Board." Two elements of the circuit in the form of strips 2 and 3 of metal foil and a piece of metal foil 4 forming the inner electrode of the capacitor are attached to the support 1 by a layer of an adhesive 5. The adhesive may for example be a thermosetting resin such as that sold as "Araldite D."

In the construction shown the foil 4 is of aluminium, magnesium or tantalum and it is formed on its upper surface with an oxide layer 6 by a forming process such as is used in the manufacture of electrolytic capacitors. In this process both the upper and lower surfaces of the foil may become coated with the oxide layer but this does not affect the operation of the capacitor.

Along one margin of the upper surface of the foil, as indicated at 7, the oxide layer is removed mechanically, for example by scraping or brushing with a wire brush. Between the foil 4 and the element 3 of the circuit the adhesive securing the foil 4 to the support is built up to form a layer which overlaps the margin of the foil 4 and the margin of the element 3. This layer is shaped in such a way that it merges smoothly with the surface of the oxide coating on the foil 4 and with the surface of the element 3.

The outer electrode of the capacitor consists of a vacuum deposited layer of metal 8 which extends almost to the exposed edge of the oxide layer 6 and overlaps the built up part of the adhesive 5. An electrical connection is made between the metal layer 8 and the element 3 of the circuit by a further metal deposit 9 which may be formed by deposition from metal vapour in a vacuum by the application of a conducting metal paint or by metal spraying, for example of a tin-lead alloy. A similar connection is made between the margin 7 of the metal foil 4 and the circuit element 2.

Figure 2:
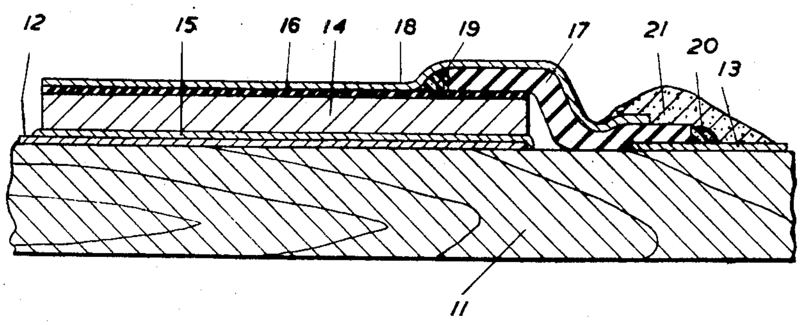

Referring to Figure 2, the printed circuit illustrated in this example is of the kind in which the circuit elements are attached directly to the surface of the insulating support for the circuit. Circuit elements 12 and 13 may for example be deposited on the support 11 by applying a powder of metal or carbon in an adhesive medium to the appropriate areas of the support.

A metal foil 14 forming the inner electrode of the capacitor is attached to the circuit element 12 by a layer of a conductive adhesive 15. This may for example be a conductive silver paint such as that sold by E. I. du Pont de Nemours as "Paint No. 5475." The upper surface of the foil 14 is formed with an oxide layer 16. If the under surface of the foil 14 carries a thick layer of oxide coating, it should be partly or completely removed mechanically, for example, by scraping or brushing with a wire brush, before the adhesive layer 15 is applied.

A strip of adhesive plastic film 17 is applied along one margin of the foil 14 and made to adhere to the support 11 between circuit elements 12 and 13 and to overlap the margin of the circuit element 13. Along the edges of the film 17 a paste made by dissolving the same plastic in a suitable solvent is applied at 19 and 20 to provide a surface which merges smoothly with the surface of the oxide film 16 and the surface of the circuit element 13.

Over the oxide film 16 and the plastic film 17 is applied a layer of metal 18 by deposition from a metal vapour in a vacuum. An electrical connection is made between the metal layer 18 and the circuit element 13 by a metal deposit 21 applied by one of the alternative methods proposed for the deposits 9 and 10 shown in Figure 1.

A protective covering layer, for instance of lacquer or wax may in some cases be applied over the capacitor and its connections. When the capacitor is to be made self-healing by depositing the outer electrode from metal vapour in a vacuum it is preferred not to apply such a covering but if a covering is applied then it is advisable to raise the potential between the electrodes of the capacitor from a low value to a value above the working voltage to clear any faults in the dielectric layer before the protective layer is applied and also if possible to use a protective layer of such a nature that it does not prevent the burning out of any further faults which may arise during the operation of the circuit.

This method of construction of capacitor permits of obtaining comparatively large values of capacitance, up to 0.1 microfarad, or even 1 microfarad, in a comparatively small area and in a very small thickness. For example using a metal foil formed with an oxide layer at 600 volts (suitable for 120 volt D. C. working) a capacity of .05 microfarad per square inch of capacitor has been obtained. The invention, therefore, provides a substantial extension of the possibilities of the printed circuit.

What I claim as my invention is:

1. In combination a printed circuit containing a capacitor comprising a support, conductive layers on the surface of and attached to the support, one of the conductive layers which is a metal selected from the group aluminum, magnesium and tantalum and forming a first electrode of the capacitor, a dielectric layer which is an oxide of the metal, formed as an adherent layer on the exposed face of the first electrode, a layer of insulating material applied to and overlapping a minor area of the dielectric near one edge of the metal layer and merging smoothly with the surface of the dielectric to form a substantially continuous smooth surface, a second electrode which is in the form of a metalized coating of self healing thickness on the exposed surface of the dielectric and the overlapping layer of insulating material and a further deposit of metal on said insulating material in contact with said metalized coating, said further deposit being of sufficient thickness to form a terminal for said electrode, at least one of the electrodes being electrically connected to a conductive layer on the support other than the first electrode.

2. In combination a printed circuit containing a capacitor comprising a support, conductive layers on the surface of and attached to the support, a first conductive layer which is a metal selected from the group aluminum, magnesium and tantalum and forming a first electrode of the capacitor, an insulating adhesive attaching the said electrode to the support, a dielectric layer which is an oxide layer, formed as an adherent layer on a major portion of the exposed surface of the first electrode leaving a minor non-oxidized portion, an electrical connection between the non-oxidized portion of the first electrode and a second conductive layer on the support spaced from said first electrode, a built-up layer of said insulating adhesive overlapping the margin of the first electrode over a portion covered with oxide layer in such a way that it merges smoothly with the oxide coating to form a substantially continuous smooth surface, said layer of adhesive also overlapping and merging smoothly with a surface of a third conductive layer on the support spaced from the first electrode, a second electrode which is in the form of a metalized coating of self healing thickness on the exposed surface of the dielectric and overlapping a substantial area of the built-up part of the adhesive, and a metallic deposit connected to said metallized coating and to the third conductive layer forming an electrical connection between the second electrode and the third conductive layer.

3. In combination a printed circuit containing a capacitor comprising a support, spaced conductive layers on the surface of and directly attached to the support, a layer of conductive adhesive over at least a portion of a first conductive layer, a layer of foil of a metal selected from the group aluminum, magnesium and tantalum attached to the first conductive layer by means of the conductive adhesive and forming a first electrode of a capacitor, a dielectric layer which is an oxide layer, formed as an adherent layer on the exposed surface of the first electrode, a strip of insulating adhesive plastic film applied along one margin of the first electrode and adhering in overlapping relation to a portion of the surface of the oxide layer, to the support, and to a second conductive layer on the support, formable insulating plastic material applied to the edges of the strip to form a substantially continuous smooth surface from the surface of the oxide layer over the plastic film and with the surface of the second conductive layer, a second electrode which is in the form of a metalized coating of self healing thickness on the oxide layer and overlapping a portion of the plastic strip, and a metallic deposit connection to said second electrode and the second conductive layer forming an electrical connection between the second electrode and the second conductive layer.

4. In combination a printed circuit containing a capacitor comprising a support, conductive layers on the surface of and attached to the support, one of the conductive layers which is of metal forming a first electrode of the capacitor, a dielectric layer which is a compound of the metal formed as an adherent layer on the exposed surface of the first electrode, a layer of insulating material applied to and overlapping a minor area of the dielectric near one edge of said first electrode and merging smoothly with the surface of the dielectric to form a substantially smooth uninterrupted surface, a metalized coating of self-healing thickness on the exposed surface of the dielectric forming a second electrode, a second conductive layer on the support spaced from the first electrode, and an electrical connection on said layer of insulating material between the second electrode and said second conductive layer, said metalized coating extending onto said applied layer of insulating material to form at least part of said electrical connection between said second electrode and said second conductive layer.

5. In combination a printed circuit containing a capacitor comprising a support, spaced conductive layers on the surface of and attached to the support, one of the conductive layers which is a metal selected from the group aluminum, magnesium and tantalum and forming a first electrode of a capacitor, a dielectric layer which is an oxide of the metal, formed as an adherent layer on the exposed surface of the first electrode, a layer of insulating material applied to and overlapping a minor area of the dielectric near one edge of said first electrode and merging smoothly with the surface of the dielectric to form a substantially continuous smooth surface therewith, a metalized coating of self-healing thickness on the exposed surface of the dielectric forming a second electrode, a second conductive layer on the support spaced from the first electrode, and an electrical connection on the overlapping layer of insulating material between the second electrode and said second conductive layer, said metalized coating extending onto said applied layer of insulating material to form at least part of said electrical connection between said second electrode and said second conductive layer.

References Cited in the file of this patent

UNITED STATES PATENTS

| | | |
|---|---|---|
| 965,992 | Dean | Aug. 2, 1910 |
| 2,174,840 | Robinson | Oct. 3, 1939 |
| 2,408,910 | Burnham | Oct. 8, 1946 |
| 2,470,826 | McMahon | May 24, 1949 |
| 2,611,040 | Brunetti | Sept. 16, 1952 |

FOREIGN PATENTS

| | | |
|---|---|---|
| 625,776 | France | Apr. 30, 1927 |